United States Patent [19]

Licht

[11] Patent Number: 4,827,439

[45] Date of Patent: May 2, 1989

[54] FACTORY FLOOR OPERATOR INTERFACE CONSOLE

[75] Inventor: Harold J. Licht, Johnson City, Tenn.

[73] Assignee: Texas Instruments Incorporated, Dallas, Tex.

[21] Appl. No.: 129,011

[22] Filed: Dec. 4, 1987

[51] Int. Cl.$^4$ .............. G06F 1/00; H05K 5/00; A47B 88/00

[52] U.S. Cl. ............... 364/708; 361/390; 312/7.2; 312/312; 312/313; 312/322; 312/323; 312/114

[58] Field of Search .......... 364/708; 361/331, 334, 361/340, 356, 358, 359, 390, 391, 395, 399, 427; 312/282, 302, 312, 313, 314, 322, 323, 339, 340, 100, 114, 7.2

[56] References Cited

U.S. PATENT DOCUMENTS

| | | | |
|---|---|---|---|
| 2,194,889 | 1/1938 | Lisle | 312/282 X |
| 2,385,593 | 9/1945 | Weston | 312/302 |
| 2,941,441 | 7/1954 | Sturgis | 361/334 X |
| 3,831,807 | 8/1974 | Deaton et al. | 312/323 X |
| 4,168,870 | 9/1979 | Hill | 312/223 |
| 4,258,967 | 3/1981 | Boudreau | 312/322 |
| 4,376,555 | 3/1983 | Grass | 308/3.8 |
| 4,425,014 | 1/1984 | Blepp | 312/284 |
| 4,589,712 | 5/1986 | Hastings | 312/236 |

Primary Examiner—A. D. Pellinen
Assistant Examiner—David Osborn
Attorney, Agent, or Firm—James P. McAndrews; John A. Haug; Melvin Sharp

[57] ABSTRACT

An operator interface console for protecting a process control equipment such as an industrial computer in a harsh factory environment has a central processing unit and a video display uit for the computer accommodated in a compartment behind a sealed door which has a sealed keyboard and a window to permit operating of the computer and viewing of the display unit while the door is closed, the window being disposed at an ergonomically desirable oblique angle facing somewhat downward to facilitate clear viewing of the display unit under changing lighting, dust and other conditions encountered in many process control situations. Both the video display unit and the central processing unit are mounted on shelf support means which are adjustable for height and through the door opening when desired for supporting the unit outside the compartment for servicing, the shelf support means for the display unit being adjustable for selectively tilting the video display unit to align the screen of the unit in closely spaced, parallel relation to the window for facilitating viewing of the screen through the window, whereby the console is adapted to receive and advantageously mount industrial computers and display units of various manufacturers with equal facility.

6 Claims, 2 Drawing Sheets

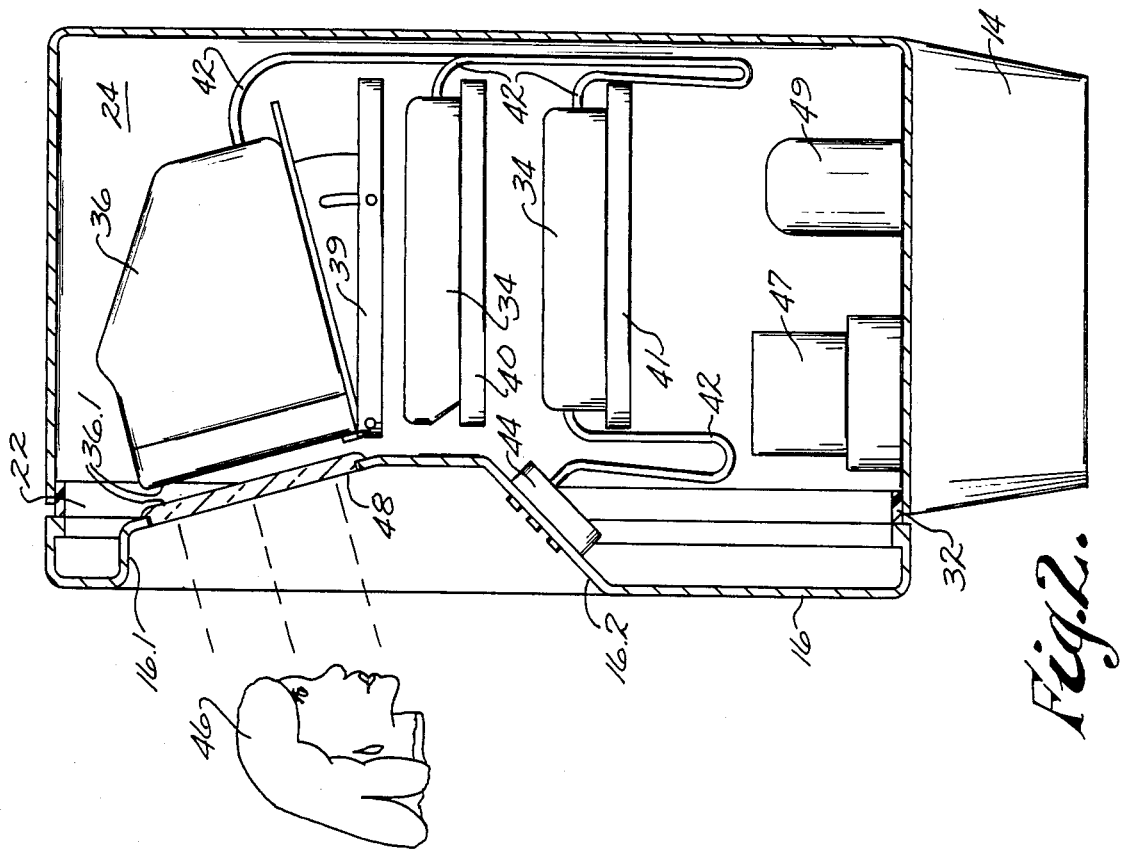
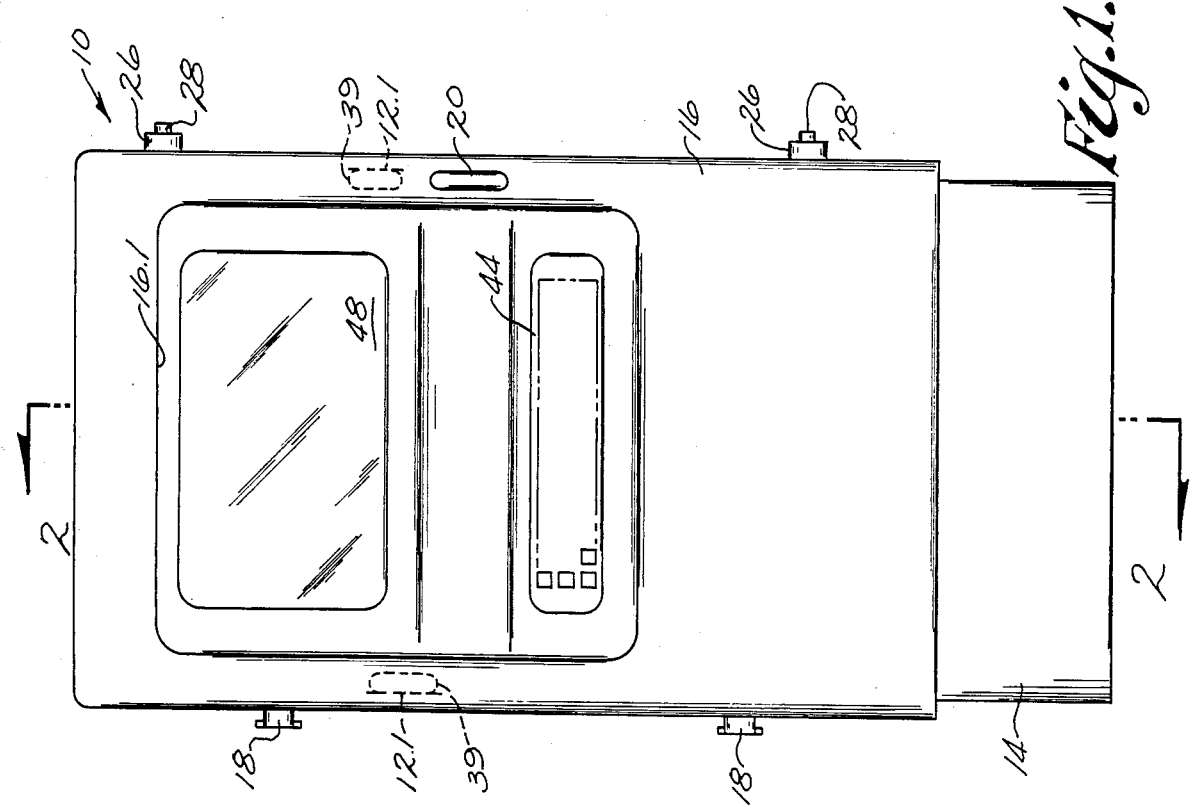

FACTORY FLOOR OPERATOR INTERFACE CONSOLE

BACKGROUND OF THE INVENTION

Industrial computer systems commonly used for process control purposes are typically made up by combining a plurality of system components made by different manufacturers to meet the performance requirements of different system applications. While it is frequently possible to adapt each individual component for use in a harsh factory environment by providing sealing means in each component for excluding dust, moisture, chemical fumes and the like, the provision of such sealing means on an individual component basis is expensive and typically results in components which are characterized by the difficulties encountered in servicing the components. Most important, the need for providing system components which are individually sealed seriously limits the variety of systems which can be set up using commercially available components. It has been found that the provision of sealed compartments for such systems has resulted in similar difficulties with respect to permitting free use of various components in the harsh factory environments while also permitting easy servicing of system components in a system console which facilitates operation of a system by a system operator.

BRIEF SUMMARY OF THE INVENTION

It is an object of this invention to provide a novel and improved an operator interface console for a process control system for use in harsh factory environments; to provide such a console in which a plurality of system components are accommodated sealed from water, dust and chemical fumes and the like while also being easily accessible for servicing; and to provide such a console having a sealed door with a window disposed at an oblique angle to permit improved viewing of a video display unit of the system while the door is closed wherein the video display unit is adjustably mounted to permit alignment of the screen of any of various commercially available display units in closely spaced parallel relation to the window for improving visibility of the screen under various factory environmental conditions.

Briefly described, the novel and improved console of the invention has a compartment for accommodating a plurality of process control system components including a central processing unit, a keyboard, and a video display unit for an industrial computer. A sealed door is provided for the compartment and the system components are mounted on shelf support means which are individually extendable through the door opening for supporting the components outside the compartment when the door is open to permit servicing of the system components. The door is provided with a window disposed at an ergonomically desirable oblique angle, the window preferably being recessed into the door and being tilted to face slightly downward for permitting viewing of the screen of the video display unit while the door is closed. The keyboard is mounted in sealed relation in the door to permit operation of the central processing unit while the door is closed. The shelf support means are adjustable in height to mount system components of various manufacturers to permit wide versatility of the system arrangements within the console and the shelf support means mounting the video display unit are adjustable for tilting the screen of the display unit into closely spaced parallel relation to the window. In that arrangement, the console window is disposed to facilitate viewing through the window by an operator standing in front of the console door. The window disposition advantageously deals with reflection of extraneous light from the window and avoids accumulation of dust or liquids such as would reduce visibility or increase risk of leakage into the compartment. The shelf support means assures that the display unit of any of a wide variety of component manufacturers is easily accommodated in the console and is easily tilted to be at a desired angle relative to the window to facilitate viewing of the unit screen when the door is closed.

DESCRIPTION OF THE DRAWINGS

Other objects, advantages and details of the novel and improved operator interface console of this invention appear in the following detailed description of preferred embodiments of the invention, the detailed description referring to the drawing in which:

FIG. 1 is a front elevation view of the operator interface console of this invention;

FIG. 2 is a diagrammatic section view along line 2—2 of FIG. 1;

DESCRIPTION OF THE PREFERRED EMBODIMENTS

Figure 3:
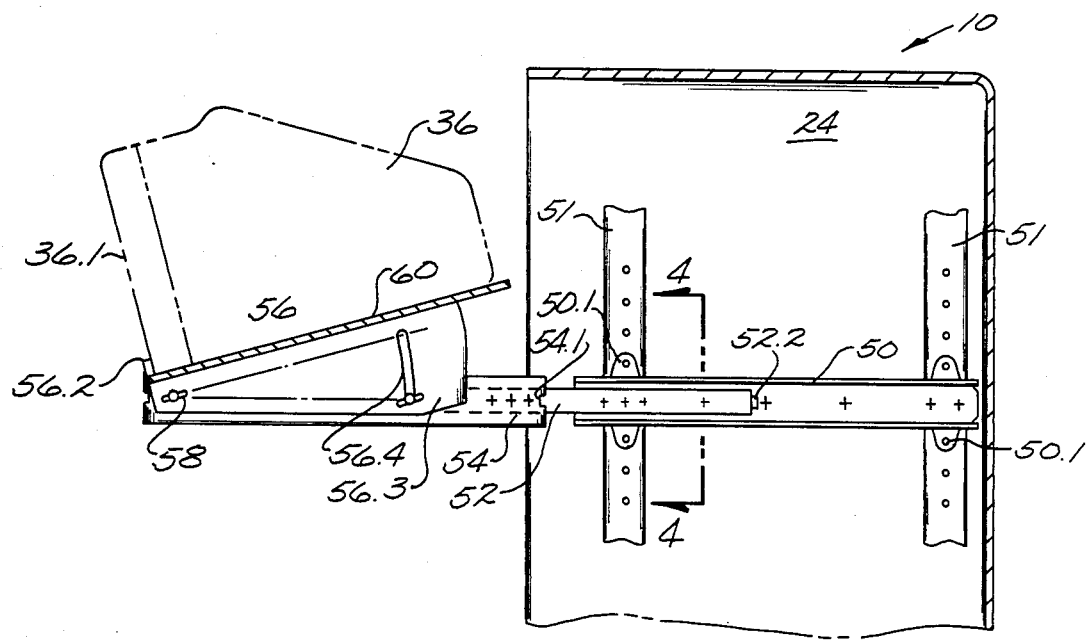
FIG. 3 is a partial side elevation view to enlarged scale of an interior compartment wall on the console illustrating shelf support means of the console.

Referring to the drawings, 10 in FIGS. 1-3 indicates the novel and improved operator interface console of this invention which is shown to include a compartment 12 of a box-like configuration supported on a base or stand 14 and having a door 16 secured to the compartment by a hinge or hinges 18. An air conditioner is preferably housed in the base. A door handle 20 is provided for swinging the door to the left as viewed in FIG. 1 for opening the door to provide a very wide and long door opening 22 (see FIG. 2) permitting easy access to the compartment interior chamber 24. Latch or clamp means 26 and 28 of any conventional type are secured to the door and to the outer compartment wall respectfully and are adapted to cooperate in any conventional manner for securing the door in closed position sealing the door opening. As will be understood, the latch and clamp means can be externally mounted as shown or can be more internal as by using a piano-type hinge or an internal latch on the door handle in a conventional manner. Preferably the door has a lip 30 and compressible gasket means 32 are secured to the compartment around the door opening to be engaged when the door is closed for sealing the door opening. Any other conventional means for sealing the compartment door over the door opening are within the scope of this invention.

In accordance with this invention, a plurality of process control or computer system components are accommodated in the sealed compartment chamber 24 including a central processing unit 34 of a computer, a video display unit 36 having a screen at one end 36.1 for displaying data provided by the computer, and typically a recorder unit 38 or the like, each of those components being mounted on separate pairs of shelf support means 39, 40, 41 and being interconnected with each other by electrical or other retractable connecting or communicating link means 42 as is diagrammatically illustrated in FIG. 2. Preferably a keyboard means 44 sealed in any conventional manner for use in harsh environments is mounted in the door in sealed relation to the door and is connected to the central processing unit as indicated in FIG. 2 by retractable connecting or communicating link means 42 for permitting operation of the central processing unit by an operator 46 from outside the console while the door is closed. Preferably the console also includes other conventional system components 47 as well as cooling system means 49 and the like as will be understood.

In accordance with the invention, the door is provided with a window 48 sealed in the door in any conventional manner to permit viewing of the video display unit screen 36.1 from outside the compartment while the console door is closed, the window being disposed at an ergonomically desirable oblique angle to facilitate viewing of the screen in the harsh factory environmental conditions wherein process control programmable controller systems are typically used. Preferably for example the door 16 is formed of sheet metal to provide a recess 16.1 therein to accommodate the window and to receive the keyboard means on an inclined lower shelf portion 16.2 of the recess, the window being provided with a slightly downward facing disposition about 7 degrees from vertical as best indicated in FIG. 2 so factory floor lighting etc. is less likely to be reflected back into the operator's eyes, so that there is less tendency for dust and other extraneous materials to accumulate on the window, so that moisture which may be splashed onto the window will be less likely to find a leak through the window seal, and so that the window is conveniently viewable by operators of different heights with similar ease and facility. The keyboard 44 is preferably tilted at an angle of about 60 degrees from vertical to facilitate operator use while also tending to deflect liquids and other extraneous materials from accumulating on the keyboard.

In accordance with this invention, pairs of shelf support means 39, 40, 41 are mounted on the inner walls 12.1 of the compartment on respective sides of the door opening 22. The shelf support means are each adjustable with respect to height and are each extendable from the compartment chamber 24 through the door opening 22 when the door is opened to support each of the various system components outside the compartment to permit convenient servicing of the system components. The retractable connecting or communicating link means 42 are adapted to permit the system components to be extended from the compartment without disconnection of the link means. In the preferred embodiment of the invention, the shelf support means 39 is adapted to tilt the video display unit 36 so that the unit screen 36.1 is aligned closely spaced parallel relation to the window 48 to facilitate clear viewing of the video screen through the window by operators of various heights or by operators standing at various viewing positions relative to the console. For clarity of illustration, the screen 36.1 is shown spaced a small distance from the window 48 but it will be understood that the spacing is preferably very close. Preferably the shelf support means 39 is adjustable for accommodating video display units of various manufacturers and is adapted to be tiltable to different angles. In that way, it is possible to assure proper alignment of display unit screens having various angular dispositions made by different manufacturers in closely spaced, parallel relation to the window 48 having the preferred window disposition selected for the present compartment configuration. In that way, the console permits wide flexibility or versatility in accommodating different types of computer system components in different combinations to provide different systems while still permitting convenient viewing of the system display screen within the console.

Figure 4:
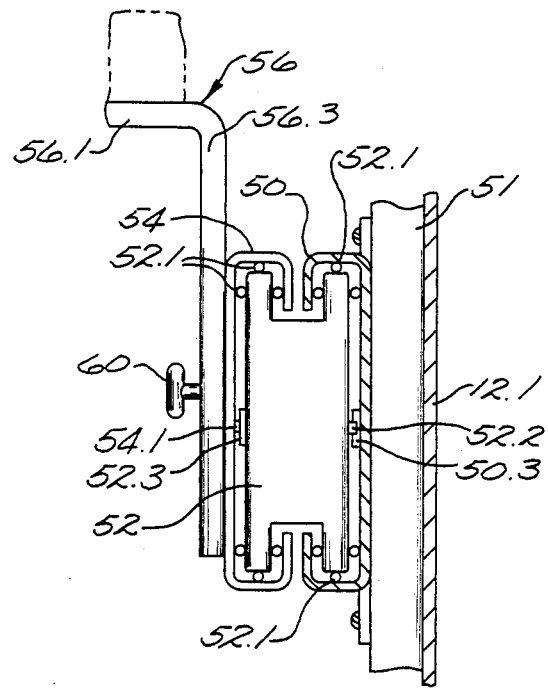
FIG. 4 is a partial section view to greatly enlarged scale along line 4—4 of FIG. 3.

In a preferred embodiment for example, the pair of shelf 30 support means 39 each comprise a channel-shaped side member support 50 adjustably at a selected height on adjusting brackets 51 fixed to the compartment wall 12.1. In the illustrated embodiment for example screw means 50.1 secure bosses 50.2 on the supports 50 in selected mounting holes 50.3 in the adjusting brackets to select shelf height. Alternately, the brackets 51 comprise U-shaped channels having legs with in-turned ends standing out from the compartment wall, and bosses on the supports are shaped to be slidable in those channels, adjustable screw means on the bosses being adapted to be tightened for clamping the bosses at selected positions in the channels for determining shelf height at any desired level, such brackets being commercially available under the designation Unistrut. A slide member 52 of conventional type having ball-bearings 52.1 mounted therein is slidable in a horizontal direction within the channel-shaped support 50 to the extent permitted by engagement of stop means 50.3 and 52.2 on the respective support and slide member. A similar channel-shaped shelf support 54 is similarly slidable on the slide member to the extent permitted by engagement of the stops 52.3 and 54.1 on the slide member and shelf support. A platform 56 for accommodating the video display unit thereon has a base 56.1 extending beneath the display unit, a front edge lip 56.2 for preventing sliding of the display unit off the base when the base is tilted as shown in FIGS. 2 and 3, and a pair of flanges 56.3 on respective sides of the base (only one being shown in FIGS. 3 and 4). The platform flanges have respective adjusting slots 56.4 therein and the flanges are adjustably secured to the shelf supports 54 in any conventional manner by use of wing nuts 58, 60 or the like so that the front edge of each flange is pivotably secured to a corresponding shelf support 54 near the front edge of the support (that is, near to the door opening) by a wing nut 58, while another portion of the flange near the rear edge of the platform base is detachably secured in a flange slot 56.4 to detachably position the platform base at a selected angle as shown in FIGS. 2 and 3 to dispose the display unit screen 36.1 in closely spaced, parallel relation to the window 48. In that arrangement, the shelf support, the slide member and the slide support in each of the shelf support means 39 are relatively movable for moving the video display unit outside the console in the manner shown in FIG. 3 to permit convenient servicing of the display unit. Preferably as will be understood, the console accommodates components 34, 36, 38, 47 and 49 and the like to counterbalance the weight of the display unit in its extended position outside the console. As will be understood the shelf support means 40 and 41 permit similar extension of the other system components from the console door opening to permit servicing.

In that way the console permits easy accommodation of various computer system components within the console for protective use therein in harsh factory environments. The system components are easily combined to form various systems without requiring use of individually sealed components. The system components are easily moved and supported outside the console compartment for servicing and their display unit used in the console is easily and conveniently viewed while sealed within the console.

It should be understood that although preferred embodiments of the invention have been described by way of illustrating the invention, the invention includes all modification and equivalents of the disclosed embodiments falling within the scope of the appended claims.

I claim:

1. A console for protecting a computer system in a harsh environment having a compartment for accommodating a computer and a video display unit with a screen for displaying data provided by the computer and having a door for selectively sealing an opening in the compartment and for permitting access to the compartment through the opening, the door having a window disposed at an ergonomically desirable oblique angle in the door for viewing the video display unit screen while the door is closed, shelf support means being mounted in the compartment for supporting the video display unit adjacent the window, the shelf support means being extendable from the compartment through the opening when the door is open to permit servicing of the unit when desired, and tiltable shelf means are adjustably mounted on the shelf support means for receiving the video display unit thereon and for selectively aligning a video display unit screen to be in closely spaced parallel relation with the window to facilitate viewing of the screen under harsh environmental conditions so that video display units of selected types are easily used in the console.

2. A console according to claim 1 wherein the shelf support means comprises a pair of slide members having ball-bearing means, a pair of slide member supports mounted on the compartment on respective sides of the door opening cooperating with the ball-bearing means for slidably mounting the slide members on the respective supports, and a pair of shelf supports cooperating with the ball-bearing means to be slidable on the respective slide members, thereby to cooperate in extending from the compartment through the door opening, and wherein the tiltable shelf means comprises a platform, means pivotably connecting opposite sides of the platform at one end of the platform to the respective shelf supports adjacent one end of the respective supports, a pair of flange means on respective opposite sides of the platform having slots therein adjacent in opposite end of the platform, and latch means on the supports adjustably positioned in respective flange slots securing the platform at a selected angle relative to the supports for aligning the video display unit screen with the door window.

3. A console according to claim 2 wherein the door has a recess formed therein and the window is disposed in the recess inclined at a selected angle facing slightly downward, the shelf support means are extendable in a horizontal direction for moving the video display unit outside the compartment when the door is opened, and the platform of the shelf support means is tiltable for disposing the screen of a video display unit thereon in a corresponding downward facing disposition parallel to the window.

4. A console according to claim 1 wherein the shelf support means comprises adjusting bracket means mounted in the compartment on respective sides of the door opening, a pair of slide member supports mounted at a selected height in the compartment on the adjustable brackets on respective sides of the door opening cooperating with the ball-bearing means for slidably mounting the slide members on the respective supports, and a pair of shelf supports cooperating with the ball-bearing means to be slidable on the respective slide members, thereby to cooperate in extending from the compartment through the door opening, and wherein the tiltable shelf means comprises a platform, means pivotably connecting opposite sides of the platform at one end of the platform to the respective shelf supports adjacent one end of the respective supports, a pair of flange means on respective opposite sides of the platform having slots therein adjacent in opposite end of the platform, and latch means on the supports adjustably positioned in respective flange slots securing the platform at a selected angle relative to the supports for aligning the video display unit screen with the door window.

5. A console for protecting a computer system in a harsh environment having a compartment for accommodating a computer and a video display unit with a screen for displaying data provided by the computer and having a door for selectively sealing an opening in the compartment and for permitting access to the compartment through the opening, the door having a window disposed at an ergonomically desirable oblique angle in the door for viewing the video display unit screen while the door is closed, shelf support means being mounted in the compartment for supporting the video display unit adjacent the window, the shelf support means being extendable from the compartment through the opening when the door is open to permit servicing of the unit when desired, and tiltable shelf means are adjustably mounted on the shelf support means for receiving the video display unit thereon and for selectively aligning a video display unit screen to be in closely spaced parallel relation with the window to facilitate viewing of the screen under harsh environmental conditions so that video display units of selected types are easily used in the console, the shelf support means comprising adjusting bracket means mounted in the compartment on respective sides of the door opening, a pair of slide member supports mounted at a selected height in the compartment on the adjustable brackets on respective sides of the door opening cooperating with the ball bearing means for slidably mounting the slide members on the respective supports, and a pair of shelf supports cooperating with the ball bearing means to be slidable on the respective slide members, thereby to cooperate in extending from the compartment through the door opening, the tiltable shelf means comprising a platform, means pivotably connecting opposite sides of the platform at one end of the platform to the respective shelf supports adjacent one end of the respective supports, a pair of flange means on respective opposite sides of the platform having slots therein adjacent in opposite end of the platform, and latch means on the supports adjustably positioned in respective flange slots securing the platform at a selected angle relative to the supports for aligning the video display unit screen with the door window, the door having a recess formed therein with the window and with keyboard means in the recess, the window being inclined at a selected angle facing slightly downward and the keyboard means being inclined at a selected angle facing upward, the shelf support means being extendable in a horizontal direction for moving the video display unit outside the compartment when the door is opened, and the platform of the shelf support means being tiltable for disposing the screen of a video display unit thereon in a corresponding downward facing disposition parallel to the window, and the keyboard means is connected to the computer by connecting means permitting operation of the computer while the door is closed and opening of the door when desired.

6. A console having a compartment for accommodating a computer and a video display unit with a screen for displaying data and having a door for an opening in the compartment for permitting access to the compartment through the opening, the door having a window disposed at an angle in the door for viewing the video display unit screen while the door is closed, a support mounted in the compartment for supporting the video display unit adjacent the window, the support being extendable from the compartment through the opening when the door is open to permit servicing of the unit when desired, and a tiltable shelf adjustably mounted on the support for receiving the video display unit thereon and for selectively aligning a screen of the video display unit to be in closely spaced parallel relation with the window to facilitate viewing of the screen.

* * * * *